(No Model.)

W. F. COLLIE.
GIN SAW GUMMER.

No. 328,654. Patented Oct. 20, 1885.

WITNESSES:

INVENTOR:
W. F. Collie
BY Munn & Co
ATTORNEYS.

UNITED STATES PATENT OFFICE.

WESLEY F. COLLIE, OF BARREN FORK, ARKANSAS.

GIN-SAW GUMMER.

SPECIFICATION forming part of Letters Patent No. 328,654, dated October 20, 1885.

Application filed May 6, 1885. Serial No. 164,562. (No model.)

*To all whom it may concern:*

Be it known that I, WESLEY F. COLLIE, of Barren Fork, in the county of Izard and State of Arkansas, have invented a new and Improved Gin-Saw Gummer, of which the following is a full, clear, and exact description.

This invention consists in a hand implement of novel construction, substantially as hereinafter shown, described, and claimed, for cleaning the saws of cotton-gins when gummed by ginning wet or damp cotton; also for cleaning off rust from the saws and preventing them from becoming rusty; likewise for straightening the teeth of the saws when bent or made to assume a bias, and whereby the brush-wheel of the gin is restrained from being cut by the saw-teeth.

Reference is to be had to the accompanying drawings, forming a part of this specification, in which similar letters of reference indicate corresponding parts in both the figures.

Figure 1:
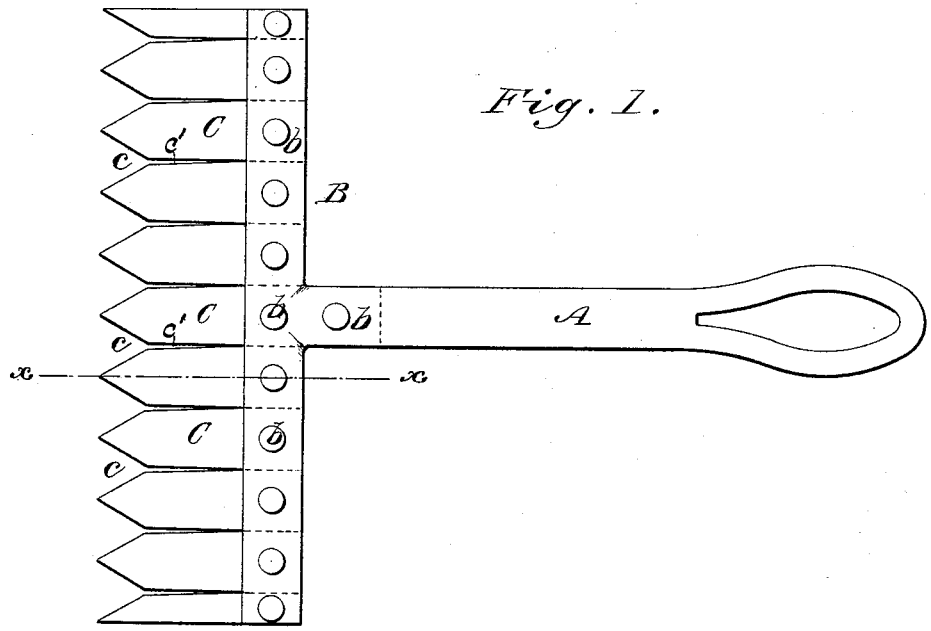
Figure 2:

Figure 1 represents a plan view of the implement, and Fig. 2 a section on the line $x\,x$ in Fig. 1.

A is the handle of the implement, constructed or provided with a cross-bar, B, in front. To this cross-bar are secured, as by rivets $b$, a series of forwardly-projecting flat teeth, C, arranged side by side, and mostly of a reverse V shape on their outer ends, so as to leave a series of V-shaped spaces, $c$, between them, spaced to correspond with the width apart of the saws in the gin. The outer teeth in the row may be made narrower than the others, and only be beveled on their one side at their front ends to act upon the one side only of a single saw, and so that, in connection with the adjacent tooth, the last saw in the gang may be cleaned on either side. The whole length of the toothed surface of the implement may be equal to that of the gang of saws in the gin; or it may be of a length so as to take in only ten (more or less) of the saws, and be applied successively each succeeding revolution of the saws to a given number of saws in succession.

The throats or spaces $c$ are provided at their vertices with narrow extensions $c'$, as shown, the particular function of which is to remove rust and wet or damp cotton from the gin-saw teeth, and to effect the straightening of the points of the teeth.

The implement is used by slipping it in between the saws while the motion of the latter is reversed, the toothed portions of the saws entering within the V-shaped spaces $c$ between the teeth of the implement.

A cheap and convenient construction of this implement is to make the handle A and cross-bar B of one and the same piece of metal, and to rivet the flat teeth C, beveled or pointed at their outer ends, to the under side of the cross-bar B, as shown.

Having thus fully described my invention, I claim as new and desire to secure by Letters Patent—

In a gin-saw gummer, the combination of the handle A, the cross-bar B, integral with the handle, and the flat teeth C, riveted to the under side of said bar B and beveled or pointed at their outer ends, essentially as shown and described.

WESLEY F. COLLIE.

Witnesses:
R. P. WILLIAMSON,
I. H. DAVIDSON.